United States Patent
Hashimoto et al.

[11] Patent Number: 5,939,194
[45] Date of Patent: Aug. 17, 1999

[54] PHOTOCATALYTICALLY HYDROPHILIFYING AND HYDROPHOBIFYING MATERIAL

[75] Inventors: Kazuhito Hashimoto, Yokohama; Akira Fujishima, Kawasaki; Toshiya Watanabe, Kitakyushu; Mitsuhide Shimohigoshi, Kitakyushu; Makoto Hayakawa, Kitakyushu, all of Japan

[73] Assignee: Toto Ltd., Fukuoka-Ken, Japan

[21] Appl. No.: 08/987,670

[22] Filed: Dec. 9, 1997

Related U.S. Application Data

[63] Continuation-in-part of application No. 08/933,886, Sep. 19, 1997.

[30] Foreign Application Priority Data

Dec. 9, 1996 [JP] Japan ................................. 8-344584
Sep. 4, 1997 [JP] Japan ................................. 9-256090

[51] Int. Cl.⁶ .................................................... B32B 9/04
[52] U.S. Cl. ........................... 428/411.1; 106/287.16; 427/126.3; 427/164; 427/165; 427/299; 428/446; 428/688; 428/689
[58] Field of Search ............................ 427/299, 165, 427/164, 126.3; 134/1; 106/287.16; 428/411.1, 446, 688, 689

[56] References Cited

U.S. PATENT DOCUMENTS

| | | |
|---|---|---|
| 3,347,816 | 10/1967 | Krauss et al. . |
| 3,451,833 | 6/1969 | Bonitz et al. . |
| 3,976,497 | 8/1976 | Clark . |
| 4,954,465 | 9/1990 | Kawashima et al. . |
| 4,955,208 | 9/1990 | Kawashima et al. . |
| 5,547,823 | 8/1996 | Murasawa et al. ............ 430/531 |
| 5,616,532 | 4/1997 | Heller et al. ................. 502/242 |
| 5,755,867 | 5/1998 | Chikuni et al. ............. 106/287.16 |

FOREIGN PATENT DOCUMENTS

| | | |
|---|---|---|
| 91042 | 5/1986 | Japan . |
| 63-100042 | 5/1988 | Japan . |
| 1-189322 | 7/1989 | Japan . |
| 1-218635 | 8/1989 | Japan . |
| 1-288321 | 11/1989 | Japan . |
| 174679 | 6/1992 | Japan . |
| 302173 | 11/1993 | Japan . |

*Primary Examiner*—Michael Lusignan
*Attorney, Agent, or Firm*—Jones, Day, Reavis & Pogue

[57] ABSTRACT

A method for highly hydrophilifying the surface of an article by photoexcitation of a semiconductor photocatalyst and maintaining the hydrophilicity is disclosed. A layer containing a photocatalyst is formed on a substrate. Onto the surface of the layer are fixed a hydroxyl group upon photoexcitation of the photocatalyst and a physically adsorbed water molecule in the vicinity of the hydroxyl group upon photoexcitation of the photocatalyst. Thus, the surface is highly hydrophilified. Further, this surface, simultaneously with the hydrophilification, exhibits higher hydrophobicity.

18 Claims, 7 Drawing Sheets

PHOTOCATALYTICALLY HYDROPHILIFYING AND HYDROPHOBIFYING MATERIAL

This application is a CIP of Ser. No. 08/933,886 filed Sep. 19, 1997.

[BACKGROUND OF THE INVENTION]

1. Field of the Invention

The present invention relates to a hydrophilic member which has an amphiphilic surface, that is, a surface having both hydrophilicity and hydrophobicity, and can permanently maintain this nature.

2. Background Art

A part of the present inventors has previously proposed a method for highly hydrophilifying the surface of articles by photoexcitation of a semiconductor photocatalyst (WO 96/29375 and WO 97/23572). According to this method, the surface of articles can be highly hydrophilified to a contact angle of the surface with water up to about 0°.

When this method is applied to, for example, transparent articles such as windshields for vehicles, door mirrors, windowpanes for buildings, eyeglass lenses, or mirrors, the surface thereof is highly hydrophilified, preventing the surface of the articles from being fogged by moisture condensate or steam or from being blurred by water droplets adhering on the surface thereof. Further, when the method is applied to buildings or articles which are disposed outdoors, oil repellent or hydrophobic dust and contaminants adhering on the hydrophilified surface are easily washed away by raindrops, thus permitting the surface to be cleaned.

[SUMMARY OF THE INVENTION]

The present inventors have clarified the state of the surface hydrophilified by the application of the method described in WO 96/29375 and WO 97/23572 and found that the hydrophilic surface has hydrophobic nature as well and that the properties of the hydrophilified surface can be further improved. The present invention has been made based on such finding.

Accordingly, an object of the present invention is to provide a hydrophilic member which has an amphiphilic (hydrophilic and hydrophobic) surface and can permanently maintain this property.

Another object of the present invention is to provide a process for producing a member having an amphiphilic surface and a method for amphiphilifying (hydrophilifying and hydrophobifying) the surface of a member.

The hydrophilic member according to one aspect of the present invention comprises a substrate and a layer, containing a photocatalyst, provided on the substrate. The surface of the layer containing a photocatalyst has a hydroxyl group fixed thereon upon photoexcitation of the photocatalyst. Furthermore, the surface of the layer containing a photocatalyst has a water molecule physically adsorbed in the vicinity of the hydroxyl group upon photoexcitation of the photocatalyst.

The hydrophilic member according to another aspect of the present invention comprises: a substrate; and a layer, containing a photocatalyst, provided on the substrate, the photocatalyst comprising a metal oxide, only oxygen atoms at bridging sites in the metal oxide being substantially exposed on the surface of the layer.

The process for producing a member having an amphiphilic surface according to the present invention comprises the steps of: providing a substrate; and forming a layer containing a photocatalyst on the substrate.

The method for amphiphilifying the surface of a member according to the present invention comprises the steps of: providing a substrate; forming a layer containing a photocatalyst on the substrate; and photoexciting the photocatalyst to amphiphilify the surface of the layer.

[DETAILED DESCRIPTION OF THE INVENTION]

The member according to the present invention is fundamentally based on a hydrophilic member described in WO 96/29375 and WO 97/23572, which are incorporated herein by reference.

Mechanism of hydrophilification and surface state

In a member with a layer containing a photocatalyst ("a photocatalyst-containing layer") formed thereon, photoexcitation of the photocatalyst permits the surface of the member to be highly hydrophilified. This is considered to proceed through the following mechanism. In particular, irradiation of a photocatalyst with light having higher energy than the band gap between the upper end of the valence band and the lower end of the conduction band in the photocatalyst results in excitation of electrons to create conduction electrons and holes either or both of which probably function to impart polarity to the surface. This permits a hydroxyl group to be adsorbed onto the surface and, in addition, a physically adsorbent water molecule to be fixed through a hydrogen bond onto the substrate in its surface adjacent to the hydroxyl group.

Figure 1:
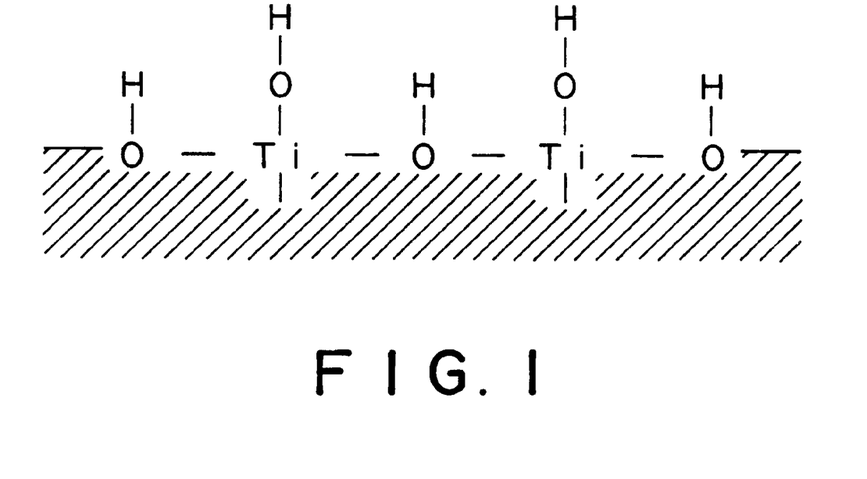
FIG. 1 is a schematic diagram showing a state that, upon photoexcitation, a metal atom in a photocatalytic oxide is reduced to create a vacancy lacking in oxygen and the vacancy is reacted with a water molecule to fix a hydroxyl group with the oxygen atom filling up the vacancy.
Figure 2:
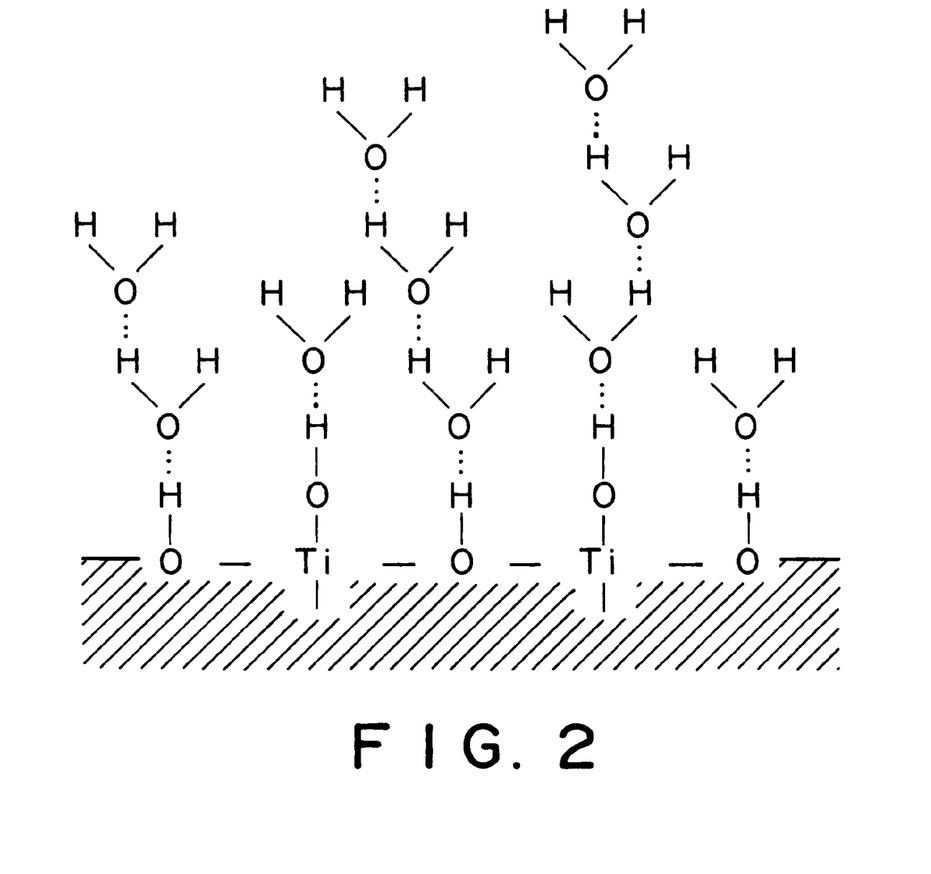
FIG. 2 is a schematic diagram showing a state that a water molecule is physically adsorbed onto the hydroxyl group, shown in FIG. 1, through a hydrogen bond.

More specifically, the hydrophilification upon photoexcitation of the photocatalyst is considered to proceed as follows. At the outset, irradiation of the photocatalyst with excitation light causes a metal atom in the photocatalytic oxide to be reduced. For example, in the case of titanium oxide, tetravalent (+4) titanium is reduced to trivalent (+3) titanium to create a vacancy lacking in oxygen on the surface. This vacancy is reacted with a water molecule to fix a hydroxyl group in such a manner that the oxygen atom fills up the vacancy. FIG. 1 illustrates this state. It is considered that a water molecule is then physically adsorbed onto the hydroxyl group through a hydrogen bond. Further, another water molecule is physically adsorbed to the physically adsorbed water molecule, so that the surface exhibits high hydrophilicity. FIG. 2 shows the state of the physically adsorbed water molecule.

The surface which has been hydrophilified through this mechanism can be permanently maintained so far as the surface is irradiated with light to cause photoexcitation of the photocatalyst. Even after the member according to the present invention is kept in the dark, the hydrophilicity is returned upon light irradiation to photoexcite the photocatalyst. According to some experiments conducted by the present inventors, the following phenomenon was observed. When a once hydrophilified member containing titanium oxide as a photocatalyst according to the present invention is kept in the dark, as is shown by the following chemical formula, the surface is reacted with oxygen to reduce the amount of the hydroxyl group chemically adsorbed onto the surface and oxygen is coordinated to titanium atoms present on the surface.

When light is again applied to the surface of the member in the presence of a water molecule to photoexcite the photocatalyst, the coordinated oxygen is locally cleaved through the following reaction. In the cleaved portion, a hydroxyl group is again bonded to the titanium atom to form a hydrophilic portion.

Interestingly, it was found that, for the chemical adsorption of a hydroxyl group and the physical adsorption of a water molecule above, the whole surface of the photocatalyst-containing layer is not simultaneously hydrophilified. Further, it was found that the hydrophilification through the mechanism is locally created and the number of hydrophilified sites and the hydrophilified area are gradually increased, thus permitting the hydrophilification of the surface to proceed. Furthermore, it was found that the contact angle of the surface with water reaches zero degree before the whole surface is hydrophilified.

In addition, interestingly, it was found that, in the member according to the present invention, the area remaining unhydrophilified is hydrophobic, that is, the hydrophilified member according to the present invention serves also as a hydrophobic member. Further, the hydrophobicity increased with increasing the hydrophilicity of the surface. This means that the hydrophobicity of the surface of the member increases simultaneously with hydrophilification to a high extent. This will be exemplified in detail. When the member according to the present invention is kept in the dark, the amount of the hydroxyl group is reduced as described above. The surface of the member in this state exhibits a hydrophobicity of about 10 degrees in terms of contact angle thereof with glyceride oleate. When light is again applied to photoexcite the photocatalyst, the hydrophobicity, of the surface, in terms of the contact angle with glyceride oleate can be lowered to not more than 10 degrees, for example, not more than 5 degrees, preferably 0 degree. At that time, the degree of hydrophilification of the surface of the member is such that the contact angle of the surface of the member with water is preferably not more than 5 degrees, more preferably 0 degree.

Figure 3:
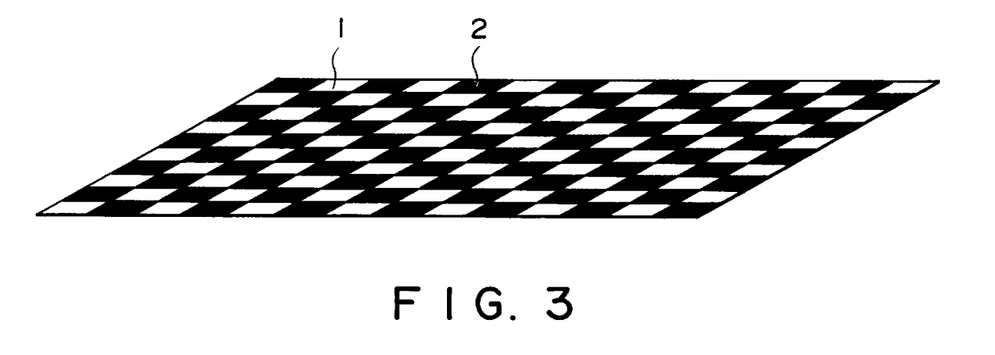
FIG. 3 is a schematic diagram showing a state that, in the surface of the member according to the present invention, a hydrophilic portion, where a hydroxyl group and a physically adsorbed water molecule are present, and a hydrophobic portion, where the hydroxyl group and the physically adsorbed water molecule are absent, are arranged in a mosaic form, wherein an open portion 1 represents the hydrophilic portion and a black portion 2 represents the hydrophobic portion.

According to the present invention, therefore, an amphiphilic member is provided wherein, in the surface of a photocatalyst-containing layer, the area, where a hydroxyl group and a physically absorbed water molecule are present, is hydrophilic, while the area, where the hydroxyl group and the physically absorbed water molecule are absent, is hydrophobic. On the surface of the member, the hydrophilic portion and the hydrophobic portion are present in a mosaic form. FIG. 3 schematically shows the surface of this member. In the drawing, an open portion 1 represents the hydrophilic portion and a black portion 2 represents the hydrophobic portion. According to a preferred embodiment of the present invention, the hydrophilic portion and the hydrophobic portion each have an area of about $10^2$ to $100^2$ $nm^2$. The reason why the hydrophobicity increases with increasing the hydrophilicity has not been elucidated yet. However, it is considered that, as compared with the case where the whole surface is homogeneously hydrophobic, the presence of a hydrophobic surface in a mosaic form as shown in FIG. 3 permits oil droplets to be rapidly and homogeneously spread on the surface of the member by virtue of a two-dimensional capillary phenomenon.

Depending upon the partial pressure of water/oil in an atmosphere, either component present in a larger amount preferentially has affinity for the surface of the member wherein the hydrophilic portion and the hydrophobic portion coexist. In particular, even when the oil component is deposited on the surface of the member, the deposited oil component can be easily removed by rinsing the surface with a large amount of water. On the other hand, when water is deposited on the surface of the member, water can be removed by rinsing the surface with a large amount of an oil solvent.

Figure 4:
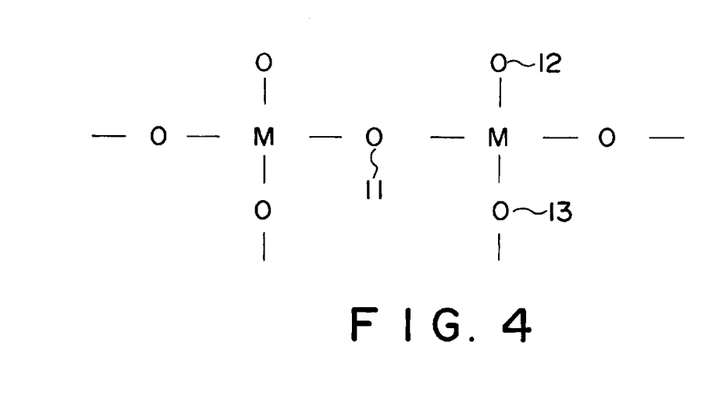
FIG. 4 is a diagram showing the atomic structure of a metal oxide as a photocatalyst, wherein M represents a metal atom and an oxygen atom 11 is located in a position linking metal atoms to each other and, in addition, is exposed on the surface of the metal oxide, this oxygen atom being defined as an oxygen atom located at a bridging site.

The present inventors have further found that the rate of hydrophilification upon photoexcitation varies depending upon the crystal face of the photocatalyst. When the photocatalyst is a metal oxide, the oxygen atom located at a bridging site in the metal oxide is mainly deficient to create a vacancy. The oxygen atom located at the bridging site will be described with reference to FIG. 4. FIG. 4 schematically shows the atomic structure of a metal oxide as a photocatalyst. In the drawing, M represents a metal atom, and oxygen atoms are bonded to the metal atom. An oxygen 11 is located in a position linking metal atoms to each other and, in addition, is exposed on the surface of the metal oxide. An oxygen atom 12 is bonded to one metal atom only and is exposed on the surface of the metal oxide, and an oxygen atom 13 is located in a position linking metal atoms to each other and, in addition, located within the crystal. In the present invention, the oxygen atom 11 is defined as an oxygen atom located at the bridging site.

Figure 5:
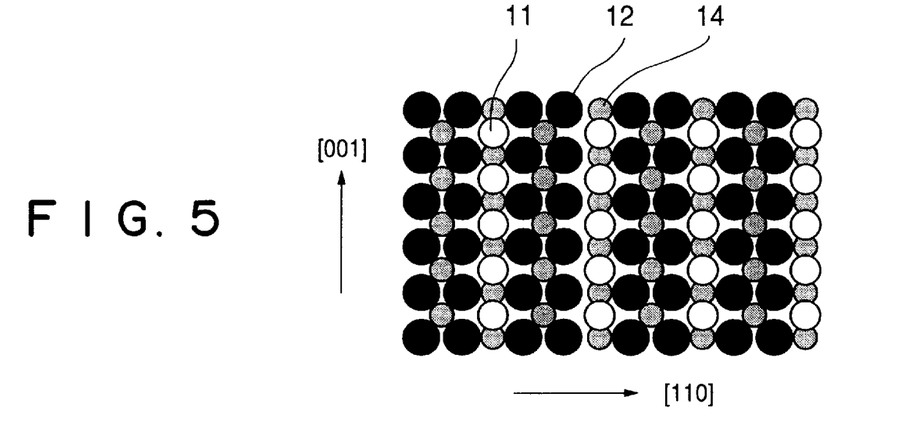
FIG. 5 is a diagram of the (110) crystal face, as viewed from above, in a rutile titanium oxide crystal.
Figure 6:
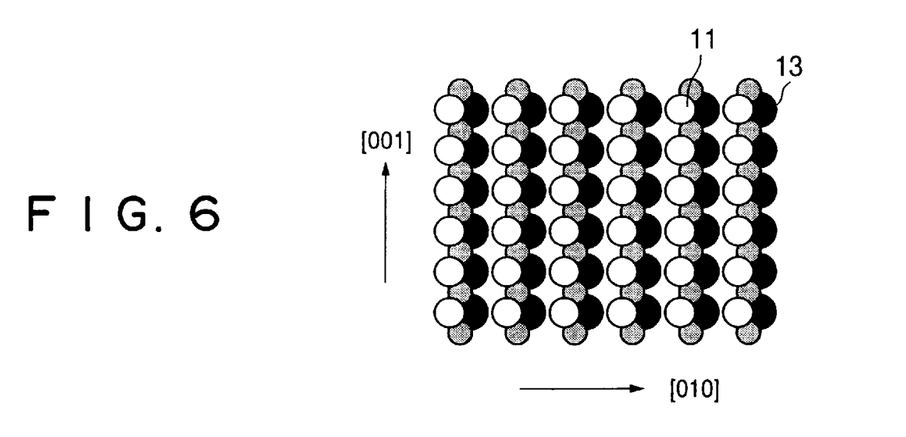
FIG. 6 is a diagram of the (100) crystal face, as viewed from above, in a rutile titanium oxide crystal.
Figure 7:
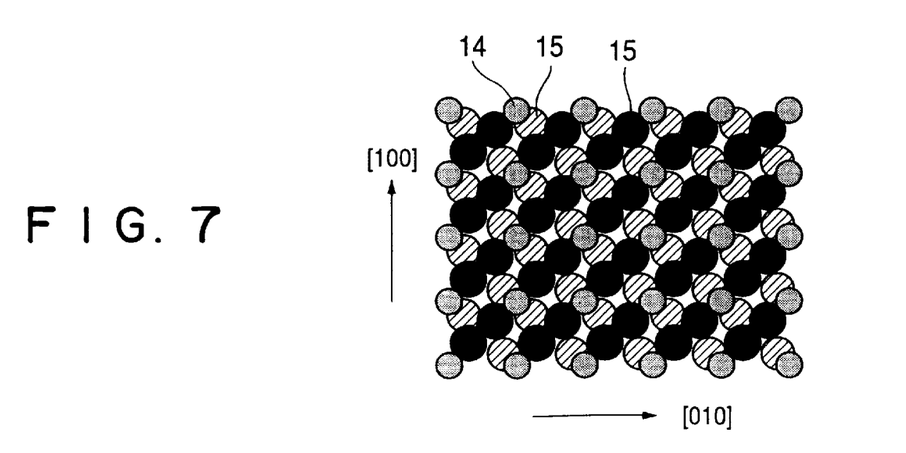
FIG. 7 is a diagram of the (001) crystal face, as viewed from above, in a rutile titanium oxide crystal.

When the member according to the present invention is constructed so that the oxygen atom alone located at the bridging site is substantially exposed on the surface of the photocatalyst-containing layer, the hydrophilification rate is improved. More specifically, the exposure of the oxygen atom located at the bridging site onto the surface of the metal oxide may be performed by regulating the crystal face(s), of the metal oxide, to be exposed on the surface. For example, among the (110) crystal face, the (100) crystal face, and the (001) crystal face in a rutile titanium oxide crystal, the (110) crystal face and the (100) crystal face are crystal faces on the surface of which the oxygen atom located at the bridging site is exposed. FIGS. 5 and 6 are diagrams showing the (110) crystal face and the (100) crystal face in the rutile titanium oxide crystal as viewed from above. In these two crystal faces, the oxygen atom 11 located at the bridging site is exposed on the surface. On the other hand, FIG. 7 shows the (001) crystal face in the rutile titanium oxide crystal. In this crystal face, all the oxygen atoms are located in a deeper position than the titanium atom 14 and are not exposed on the surface of the crystal face. Therefore, according to the present invention, when the rutile titanium oxide crystal is used, use of the (110) crystal face and the (100) crystal face, on the surface of which the oxygen atom located at the bridging site is exposed, as the surface of the member is preferred.

On the other hand, in the anatase titanium oxide crystal, since the crystal face, on the surface of which the oxygen atom located at the bridging site is exposed, is the (001) crystal face, use of this crystal face as the surface of the member is preferred.

Applications of member

The member according to the present invention, by virtue of the high hydrophilicity and hydrophobicity, can be utilized in various applications.

Applications utilizing the hydrophilicity include those described in WO 96/29375 and WO 97/23572, which are incorporated herein by reference.

Applications utilizing both the hydrophilicity and the hydrophobicity include those where the member gets intimate with an oil and the oil component is easily removed. For example, in the field of industrial equipment, machine tools, bearings, and cutting disks, high lubricity of the oil during use and easy removal of the oil component at the time of washing are often required. Although the member according to the present invention gets highly intimate with the oil, the deposited oil component can be easily removed by washing. Thus, the member according to the present invention can be preferably used in the above applications.

Photocatalyst-containing layer

The term "photocatalyst" used herein refers to a material which, when exposed to light (excitation light) having higher energy (i.e., shorter wavelength) than the energy gap between the conduction band and the valence band of the crystal, can cause excitation (photoexcitation) of electrons in the valence band to produce a conduction electron and a hole. Specific examples thereof include, for example, anatase titanium oxide, rutile titanium oxide, zinc oxide, ferric oxide, dibismuth trioxide, tungsten trioxide, and strontium titanate. Further, photocatalysts described in WO 96/29375 and WO 97/23572 are also usable in the present invention, and the disclosure of these publications is incorporated herein by reference.

Light sources which may be favorably used for photoexcitation of the photocatalyst include sunlight, room lamps, fluorescent lamps, incandescent lamps, metal halide lamps, mercury lamps, and xenon lamps.

In the present invention, in order to highly hydrophilify the surface upon photoexcitation of the photocatalyst, the intensity of the excitation light is preferably not less than 0.001 mW/cm$^2$, more preferably 0.01 mW/cm$^2$, most preferably not less than 0.1 mW/cm$^2$.

In the present invention, the photocatalyst-containing layer may comprise silica or silicone besides the photocatalyst. Addition of silica or a silicone can offer an advantage that, even when the member according to the present invention is kept in the dark, the hydrophilicity can be maintained for a long period of time.

In the present invention, the photocatalyst-containing layer may further contain silver, copper, or zinc. Addition of these metals enables bacterial and mold deposited onto the surface of the member according to the present invention to be killed even when the member is kept in the dark, offering an advantage that the surface can be always kept clean.

Further, according to a preferred embodiment of the present invention, platinum group elements, such as platinum, palladium, ruthenium, rhodium, iridium, and osmium, may be added to the photocatalyst-containing layer. Addition of these metals can enhance the redox activity of the photocatalyst and can improve the deodorant and cleaning effect.

In the present invention, the thickness of the photocatalyst-containing layer may be suitably determined so far as the effect of the photocatalyst can be attained. According to a preferred embodiment, the layer thickness is not more than 0.4 μm. This layer thickness can prevent opacification attributable to diffused reflection of light, so that the surface layer becomes substantially transparent. The layer thickness is more preferably not more than 0.2 μm. This thickness can prevent color development of the layer attributable to the interference of light and can offer improved transparency. Further, reduced layer thickness advantageously results in improved abrasion resistance of the layer.

Preparation

The member according to the present invention can be prepared by forming the photocatalyst-containing layer on the surface of a member to be served as a suitable substrate.

The photocatalyst-containing layer may be produced according to the disclosure in WO 96/29375 and WO 97/23572, which are incorporated herein by reference.

According to a preferred embodiment, when the photocatalyst-containing layer consists of anatase titanium oxide alone, preferably, it may be produced by a sol coating/annealing method, an organotitanate method, or an electron beam vapor deposition method.

(1) Sol coating/annealing method

An anatase titanium oxide sol is coated onto the surface of a substrate by spray coating, dip coating, flow coating, spin coating, roll coating or the like, and the coating is then annealed.

(2) Oragnotitanate method

A hydrolysis inhibitor (such as hydrochloric acid or ethylamine) is added to an organotitanate, such as a titanium alkoxide (such as tetraethoxytitanium, tetramethoxytitanium, tetrapropoxytitanium, or tetrabutoxytitanium), titanium acetate, or a titanium chelate, and the mixture is diluted with a nonaqueous solvent, such as an alcohol (such as ethanol, propanol, or butanol). While partially progressing hydrolysis or after complete hydrolysis, the mixture is coated by spray coating, dip coating, flow coating, spin coating, roll coating or the like, and the coating is then dried. The drying results in completion of the hydrolysis to produce titanium hydroxide, and an amorphous titanium oxide layer is formed on the surface of the substrate by dehydropolycondensation of titanium hydroxide. Thereafter, the layer is then annealed at a temperature of the crystallization temperature of anatase or above to develop phase transition of the amorphous titanium oxide to anatase titanium oxide.

(3) Electron beam deposition

A titanium oxide target is irradiated with an electron beam to form a layer of amorphous titanium oxide on the surface of a substrate. Thereafter, the layer is annealed at a temperature of the crystallization temperature of anatase to develop amorphous titanium oxide to anatase titanium oxide.

When the photocatalyst-containing layer is formed of anatase titanium oxide and silica, the member of the present invention may be preferably produced, for example, by a sol coating/annealing method, an organotitanate method, or a tetrafunctional silane method.

(1) Sol coating/annealing method

A mixed solution composed of an anatase titanium oxide sol and a silica sol is coated by spray coating, dip coating, flow coating, spin coating, roll coating or the like, and the coating is then annealed.

(2) Organotitanate method

A hydrolysis inhibitor (such as hydrochloric acid or ethylamine) and a silica sol are added to an organotitanate, such as a titanium alkoxide (such as tetraethoxytitanium, tetramethoxytitanium, tetrapropoxytitanium, or tetrabutoxytitanium), titanium acetate or a titanium chelate, and the mixture is diluted with a nonaqueous solvent, such as an alcohol (such as ethanol, propanol, or butanol). While partially progressing hydrolysis or after complete hydrolysis, the mixture is coated by spray coating, dip coating, flow coating, spin coating, roll coating or the like, and the coating is then dried. The drying results in completion of the hydrolysis to produce titanium hydroxide, and an amorphous titanium oxide layer is formed on the surface of the substrate by dehydropolycondensation of titanium hydroxide. Thereafter, the layer is then annealed at a temperature of the crystallization temperature of anatase or above to develop phase transition of the amorphous titanium oxide to anatase titanium oxide.

(3) Tetrafunctional silane method

A mixture of a tetraalkoxysilane (such as tetraethoxysilane, tetrapropoxysilane, tetrabutoxysilane, or tetramethoxysilane) with an anatase titanium oxide sol is coated onto the surface of a substrate by spray coating, dip coating, flow coating, spin coating, roll coating or the like, and, if necessary, after hydrolysis to form a silanol, the silanol is dehydropolycondensed by heating or the like.

When the photocatalyst-containing layer is formed of anatase titanium oxide and a silicone, the member according to the present invention may be produced as follows. Specifically, a coating of a silicone or a silicone precursor is mixed with an anatase titanium oxide sol, and, if necessary, after hydrolysis of the precursor, the mixture is coated on the surface of a substrate by spray coating, dip coating, flow coating, spin coating, roll coating or the like, followed by heating or the like to dehydropolycondensate the hydrolyzate of the silicone precursor to form a surface layer formed of anatase titanium oxide particles and a silicone. Upon photoexcitation of anatase titanium oxide by irradiation with light including an ultraviolet radiation, at least a part of organic groups bonded to the silicon atom in the silicone molecule is substituted by a hydroxyl group, and a physically adsorbed water layer is further formed thereon, thus permitting the surface layer thus to exhibit high hydrophilicity.

In this case, preferred examples of silicone precursors include methyltrimethoxysilane, methyltriethoxysilane, methytributoxysilane, methyltripropoxysilane, ethyltrimethoxysilane, ethyltriethoxysilane, ethyltributoxysilane, ethyltripropoxysilane, phenyltrimethoxysilane, phenyltriethoxysilane, phenyltributoxysilane, phenyltripropoxysilane, dimethyldimethoxysilane, dimethyldiethoxysilane, dimethyldibutoxysilane, dimehyldipropoxysilane, diethyldimethoxysilane, diethyldiethoxysilane, diethyldibutoxysilane, diethyldipropoxysilane, phenylmethyldimethoxysilane, phenylmethyldiethoxysilane, phenylmethyldibutoxysilane, phenylmethyldipropoxysilane, γ-glycidoxypropyltrimethoxysilane, and hydrolyzates thereof and mixtures thereof.

When exposing of the oxygen atom located at the bridging site is contemplated, the photocatalytic oxide is fixed in a crystallographically oriented state onto the surface of the substrate. Methods usable for this purpose include, for example, hot press annealing at 400° C. or above after the ion beam deposition (Journal of Material Research, vol. 2, No. 2 (1987)).

The member to be served as the substrate may be suitably determined by taking applications into consideration, and specific examples of substrates include those described in WO 96/29375 and WO 97/23572, which are incorporated herein by reference.

Among others, the following substrates are preferred in the present invention.

When the member is expected to have antifogging effect, examples of substrates usable herein include: mirrors, such as rearview mirrors for vehicles, bathroom mirrors, lavatory mirrors, dental mouth mirrors, reflecting mirrors for roads; lenses, such as eyeglass lenses, optical lenses, lenses for cameras, lenses for endoscopes, lighting lenses, lenses for semiconductors, and lenses for copying machines; prisms; windowpanes for building or observation; windowpanes for vehicles, such as automobiles, railway vehicles, aircrafts, watercrafts, submarines, snowmobiles, ropeway gondolas, pleasure garden gondolas and spacecrafts; windshields for vehicles, such as automobiles, railway vehicles, aircrafts, watercrafts, submarines, snow cars, snowmobiles, motorcycles, ropeway gondolas, pleasure garden gondolas and spacecrafts; goggles for protection, goggles for sports, shields of masks for protection, shields of masks for sports, shields of helmets, glasses of display case for frozen foods, and glasses of display cases for thermally kept foods; covers for measuring instruments; and films for application onto the above articles. These are required to be transparent, and materials therefor include glass and plastics.

When the member is expected to have surface cleaning effect, examples of substrates usable herein include building materials, exterior of buidlings, interior of buildings, sashes, windowpanes, structural members, exterior and coating of vehicles, exterior of machineries and articles, dustproof covers and coatings, traffic signs, various display devices, advertising towers or poster columns, noise barriers for roads, noise barriers for rail roads, bridges, exterior and coating of guard rails, interior facing and coating of tunnels, insulators, cover for solar cells, covers for solar energy collectors of solar water heaters, vinyl plastic hothouses, covers for lighting of vehicles, households, stools, bath tubs, wash basins, lighting equipment, covers for lighting, kitchenwares, tablewares, dishwashers, dishdryers, sinks, cooking ranges, kitchen hoods, ventilation fans, and films for application on the surface of the above articles. Materials thereof include metals, ceramics, glasses, plastics, woods, stones, cements, concretes, fibers, woven fabrics, and combinations of the above materials and laminates of the above materials.

Further, when the member is expected to have antistatic effect, examples of substrates usable herein include: cathode-ray tubes; magnetic recording media; optical recording media; photomagnetic recording media; audio tapes; video tapes; analog records; housings, components, exterior and coatings of domestic electric appliances; housings, components, exterior and coatings of office automation equipment; building materials; exterior of the buidlings; interior of the buildings; sashes; windowpanes; structural members; exterior and coating of vehicles; exterior of machineries and articles; dustproof covers and coatings; and films for application onto the surface of the above articles. Examples of materials therefor include metals, ceramics, glasses, plastics, woods, stones, cements, concretes, fibers, woven fabrics, and combinations of the above materials and laminates of the above materials.

[EXAMPLES]

Example A1

Influence of excitation wavelength

A titanium oxide (anatase form) sol (STS-11, manufactured by Ishihara Sangyo Kaisha Ltd.) was spray-coated on the surface of a glazed tile having a size of 5×10 cm square (AB02E01, manufactured by TOTO, LTD.), and the coating was fired for 10 min at 800° C. to prepare a sample A1.

For comparison, a glazed tile not having a titanium oxide coating was allowed to stand in the dark for 10 days. These samples were tested as follows.

The sample A1 and the comparative sample were irradiated with monochromatic ultraviolet light using an Hg-Xe lamp under conditions specified in the following Table 1, and a change in contact angle with water as a function of the irradiation time was determined. In this case, the contact angle of the samples with water was measured, with a contact angle goniometer (Model CA-X150, manufactured by Kyowa Interface Science Co., Ltd.), 30 sec after dropping a water droplet through a microsyringe on the surface of the sample.

TABLE 1

| Wavelength of UV light (nm) | Irradiation intensity of UV light (mW/cm$^2$) | Density of photon (photon/sec/cm$^2$) |
| --- | --- | --- |
| 313 | 10.6 | 1.66 × 10$^{16}$ |
| 365 | 18 | 3.31 × 10$^{16}$ |
| 405 | 6 | 1.22 × 10$^{16}$ |

Figure 8A:
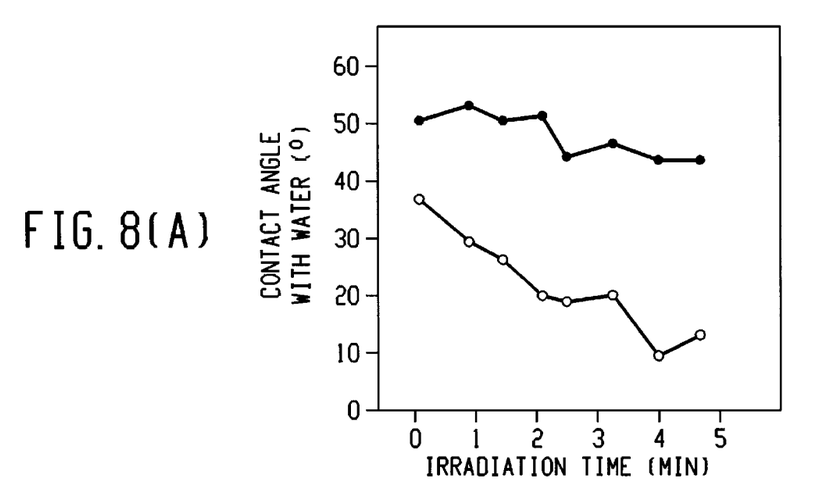
FIG. 8 is a graph showing a change in contact angle of the surface of a photocatalytic titanium oxide layer with water upon irradiation of the surface of the photocatalytic titanium oxide layer with ultraviolet light having different wavelengths as a function of light irradiation time, this change having been determined in Example A1, wherein FIG. 8 (A) shows data for irradiation with light having a wavelength of 313 nm, FIG. 8 (B) data for irradiation with light having a wavelength of 365 nm, and FIG. 8 (C) data for irradiation with light having a wavelength of 405 nm.
Figure 8B:
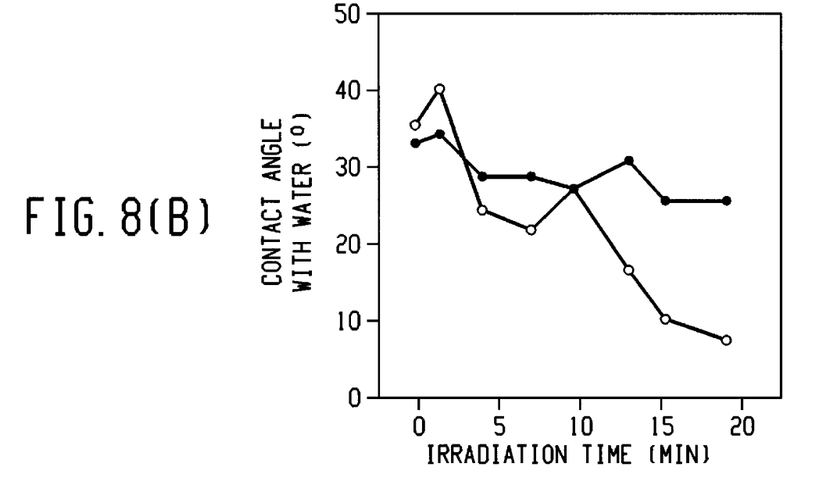
Figure 8C:
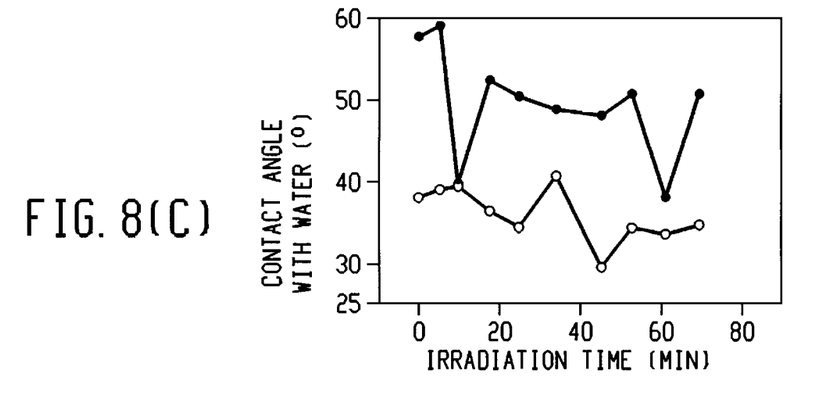

The results are shown as graphs in FIGS. 8 (A) to 8 (C). In these graphs, values plotted by open circles represent the contact angle of the sample A1 with water, and values plotted by closed circles represent the contact angle of the comparative glazed tile, not coated with titanium oxide, with water.

As can be seen from the graph shown in FIG. 8 (C), the irradiation of the sample with ultraviolet light having lower energy than that at a wavelength of 387 nm corresponding to the band gap energy of the anatase titania (i.e., ultraviolet light having a longer wavelength than 387 nm) results in no hydrophilification. On the other hand, as shown in graphs of FIGS. 8 (A) and 8 (B), in the case of irradiation of the sample with ultraviolet light having higher energy than the band gap energy of the anatase titania, the surface of the sample is hydrophilified in response to the ultraviolet light irradiation. From the results, it has been confirmed that the hydrophilification of the surface does not occur without the photoexcitation of the semiconductor photocatalyst and is attributable to the photocatalytic action.

Example A2

Adsorption of hydroxyl group and physical adsorption of water molecule by photoexcitation A titanium oxide (anatase form) powder (P-25, manufactured by Nippon Aerosil Co., Ltd.) was pressed to prepare disk samples. The surface of these samples was investigated by Fourier transform infrared spectroscopy (FT-IR) using a Fourier transform infrared spectrometer (FTS-40A).

In each test, an ultraviolet lamp (UVL-21) at a wavelength of 366 nm was used for ultraviolet irradiation. In the analysis of the infrared absorption spectrum, the following absorption band peaks having the following wavenumbers appear and provide the following information.

Sharp absorption band at wavenumber 3690 cm$^{-1}$: stretching of OH of hydroxyl group Broad absorption band at wavenumber 3300 cm$^{-1}$: stretching of OH bond in physically adsorbed water Sharp absorption band at wavenumber 1640 cm$^{-1}$: bending of HOH bond in physically adsorbed water At the outset, the titanium oxide disk immediately after pressing was analyzed by infrared spectroscopy. An absorption spectrum for the disk immediately after pressing is shown as a curve #1 in FIGS. 9 (A) and 9 (B).

The titanium oxide disk was stored for 17 hr in a dry box containing silica gel as a desiccant and then analyzed by infrared spectroscopy to provide an infrared absorption spectrum. The absorption spectrum thus obtained is shown as a curve #2 in FIGS. 9 (A) and 9 (B).

Figure 9A:
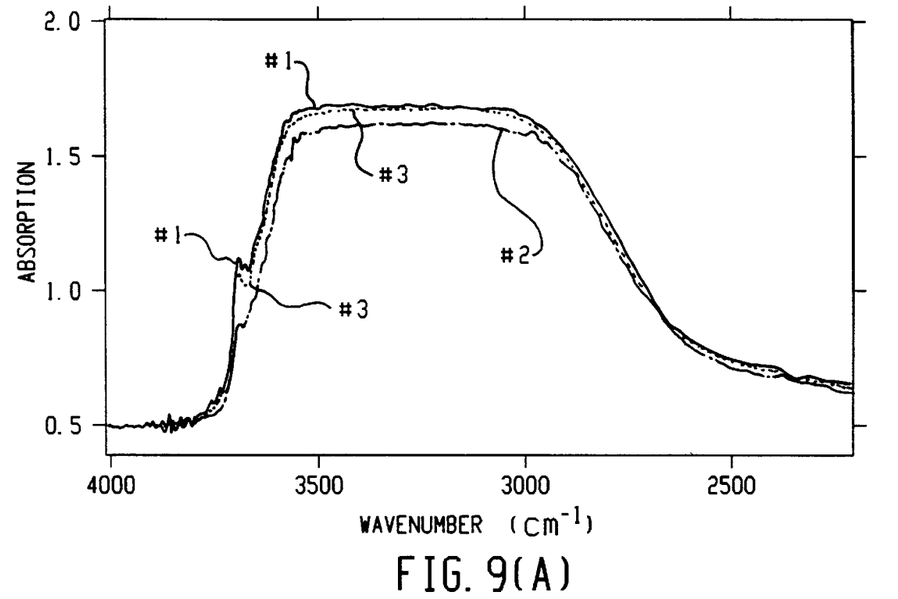
FIG. 9 is a graph showing the results of an infrared spectroscopic analysis of a titanium oxide disk in Example A2, wherein FIG. 9 (A) shows data for wavenumbers 4000 to 2000 and FIG. 9 (B) data for wavenumbers 2000 to 1200.
Figure 9B:
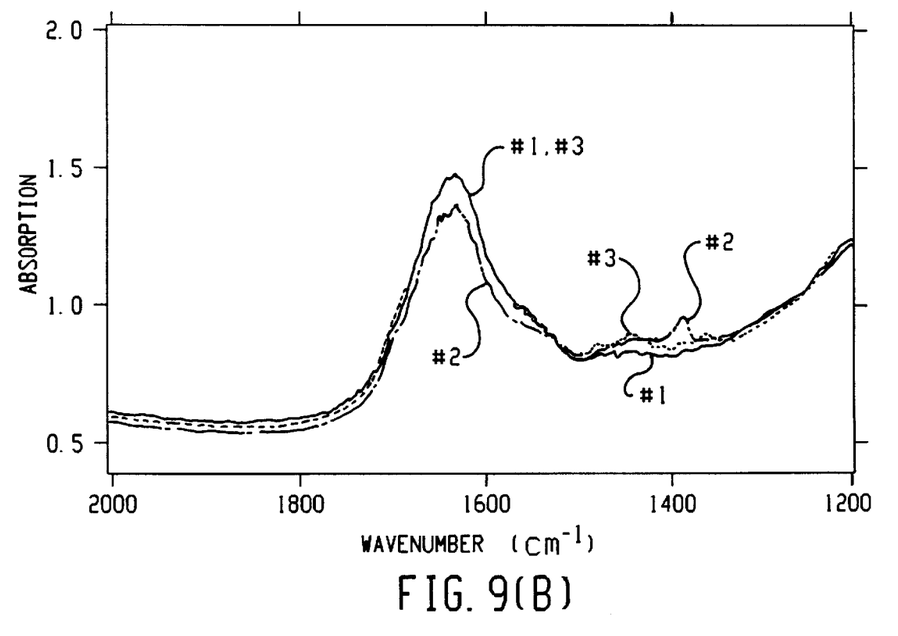

Comparison of the spectrum #1 with the spectrum #2 shows that, for #2, a dramatic reduction in absorption is observed at wavenumber 3690 $cm^{-1}$, indicating a reduction in hydroxyl group (chemically adsorbed water). Further, for #2, a dramatic reduction in absorption is observed also at wavenumbers 3300 $cm^{-1}$ and 1640 $cm^{-1}$, indicating that the physically adsorbed water as well has been reduced. Thus, it is apparent that storage in dry air resulted in a reduction in both chemically adsorbed water and physically adsorbed water. In general, when the disk is allowed to stand in the dark, the contact angle of the disk to water is increased, suggesting that the surface of the disk has been rendered somewhat hydrophobic.

The titanium oxide disk was then placed in the dry box and irradiated with ultraviolet light at an irradiation intensity of about 0.5 $mW/cm^2$ for one hr, followed by infrared spectroscopic analysis of the surface of the disk to provide an infrared absorption spectrum. The absorption spectrum thus obtained is shown as a curve #3 in FIGS. 9 (A) and 9 (B). As can be seen from the absorption spectrum #3, the absorption at wavenumber 3690 $cm^{-1}$ returned to substantially the same level of absorption as observed in the initial state. Further, the absorption at wavenumbers 3300 $cm^{-1}$ and 1640 $cm^{-1}$ also returned to the same level of absorption as observed in the initial state. These results show that ultraviolet irradiation brings both the amount of the hydroxyl group and the amount of the physically adsorbed water to those observed in the original state.

As is apparent from the results of Example A1, since ultraviolet irradiation results in lowered contact angle of the surface of titanium oxide particles with water, it is considered that, also in this case, the surface thereof has been hydrophilified.

Example A3

Investigation of form of adsorption of hydroxyl group and physically adsorbed water The surface state of the (110) face (crystal face, with the highest atom density, having such a structure that oxygen atoms crosslinking titanium are arranged in the direction of c axis) was investigated by atomic force microscopy (AFM).

At the outset, for the rutile single crystal, the contact angle of the (110) face with water was measured and found to be 63°. Further, for this sample, the (110) face was observed under an atomic force microscope. As a result, only a smooth face was found, and no protrusion attributable to the adsorption of a hydroxyl group and physically adsorbed water was found, demonstrating that the surface of the rutile single crystal is hydrophobic in the original state.

Ultraviolet light was applied at 1 $mW/cm^2$ to the (110) face for 42 hr. Thereafter, the contact angle of the (110) face with water was measured. As a result, it was found that the (110) face was hydrophilified to 37° in terms of the contact angle. For this sample, the (110) face was observed under an atomic force microscope. As a result, a waterdrop pattern in a mosaic form was recognized. The proportion of the area occupied by the waterdrop pattern was determined and found to be 22%. Further, observation using a hydrophilic probe demonstrated that the waterdrop pattern was made of water, suggesting that the waterdrop pattern observed herein is composed of a hydroxyl group and physically adsorbed water.

As a result of observation of the waterdrop pattern portion in a further enlarged state, it was found that a hill-like protrusion portion is present adjacent to a thin striped protrusion portion. The size of the striped protrusion portion and the hill-like protrusion portion was examined by atomic force microscopy. As a result, the stripe protrusion portion had a height of 0.3 nm and a width of 16 nm. Since the atomic distance of O-H in water is about 0.1 nm, it is considered that several hydroxyl groups adsorbed on the stripe portion gather to form a hydrophilic domain. The hill-like protrusion portion had a height of 7 nm and a width of 85 nm.

Nitrogen gas was then sprayed on the (110) face, and a change in the hill-like protrusion portion was observed by atomic force microscopy. As a result, it was found that the hill-like protrusion disappeared, suggesting that the hill-like protrusion portion was composed of physically adsorbed water. That is, the thickness of the physically adsorbed water was judged to be equal to the hill-like protrusion portion and to be 7 nm.

Thus, it was demonstrated that the photoexcitation of a photocatalyst resulted in adsorption of a hydroxyl group and permitted physically adsorbed water to be adsorbed adjacent to the hydroxyl group. Further, since the hydroxyl group is adjacent to the physically adsorbed water, it is expected that, upon photoexcitation of the photocatalyst, the hydroxyl group is first adsorbed to form a domain and the physically adsorbed water is then adsorbed by a hydrogen bond to the hydroxyl group.

Example B1

An anatase titanium oxide sol was coated onto a glass substrate by spray coating, and the coating was annealed at 500° C. to prepare sample B1 comprising a 0.3 $\mu$m-thick thin layer of a photocatalyst provided on the surface of a glass substrate. The thin layer surface of the sample B1 had a contact angle with water of 37°, that is, was hydrophilic.

The sample B1 was allowed to stand in the dark for 2 months to prepare sample B2. The contact angle of the sample B2 with water was measured and found to be increased to 72°. That is, the surface was hydrophobified. In this case, the contact angle of the sample B2 with glyceride trioleate, which is a main component of a food oil, was also measured and found to be 10°, indicating that the sample B2 is hydrophobic.

Further, the sample B2 was irradiated with ultraviolet light having a central wavelength of 360 nm at 1 $mW/cm^2$ for 10 hr to prepare sample B3. The contact angle of the sample B3 with water was measured and found to be decreased to 0°, indicating that the surface was superhydrophilified. In this case, the contact angle of the sample B3 with glyceride trioleate, which is a main component of a food oil, was also measured and found to be decreased to 2°, indicating that the surface was superhydrophobified.

Glyceride trioleate was then dropped onto the surface of the sample B3, and the sample B3 was rinsed with water. As a result, glyceride trioleate was easily removed.

Further, water was dropped on the surface of the sample B3, and the sample B3 was rinsed in glyceride trioleate. As a result, water was easily removed.

Example B2

A thin film of a rutile titanium oxide single crystal was allowed to stand in the dark for 2 months to prepare sample B4. For the sample B4, the contact angle of the (110) face with water was measured and, as with the contact angle of the sample B2, was found to be high, i.e. 63°, suggesting that the sample B2 and the sample B4 have substantially the same microstructure.

The surface of the sample B4 was observed under an atomic force microscope. As a result, a smooth face was observed. Thus, it was confirmed that the surface of the sample was homogeneous. Consideration of all the results of measurement of the contact angle of the sample B2 on its surface with glyceride trioleate and the results of the observation of the sample B4 on its surface under an atomic force microscope has lead to a conclusion that the surface of the sample B2 and the surface of the sample B4 had homogeneous hydrophobicity.

Further, the surface of the sample B4 was irradiated with ultraviolet light having a central wavelength of 360 nm at 1 mW/cm$^2$ for 42 hr to prepare sample B5. The contact angle of the surface of the sample B5 with water was measured and found to be 37°, indicating that the surface was hydrophilified.

The surface of the sample B5 was observed under an atomic force microscope. As a result, unlike the sample B4, a waterdrop-like protrusion, in a mosaic form, of several tens of nm in size was observed.

Example B3

An anatase titanium oxide sol was spray-coated onto a glass substrate with gold vapor-deposited thereon, and the coating was annealed at 500° C. to form a 0.3 µm-thick thin layer of a photocatalyst on the surface of the glass substrate. The coated substrate was used as sample B6.

The sample B6 was allowed to stand in the dark for 7 days to prepare sample B7.

Further, the surface of the sample B7 was irradiated with ultraviolet light having a central wavelength of 360 nm at 1 mW/cm$^2$ for 5 hr to prepare sample B8.

The surface of the samples B6 to B8 was observed by Fourier transform infrared spectroscopy (FT-IR) using a Fourier transform infrared spectrometer (FTS-40A).

Figure 10:
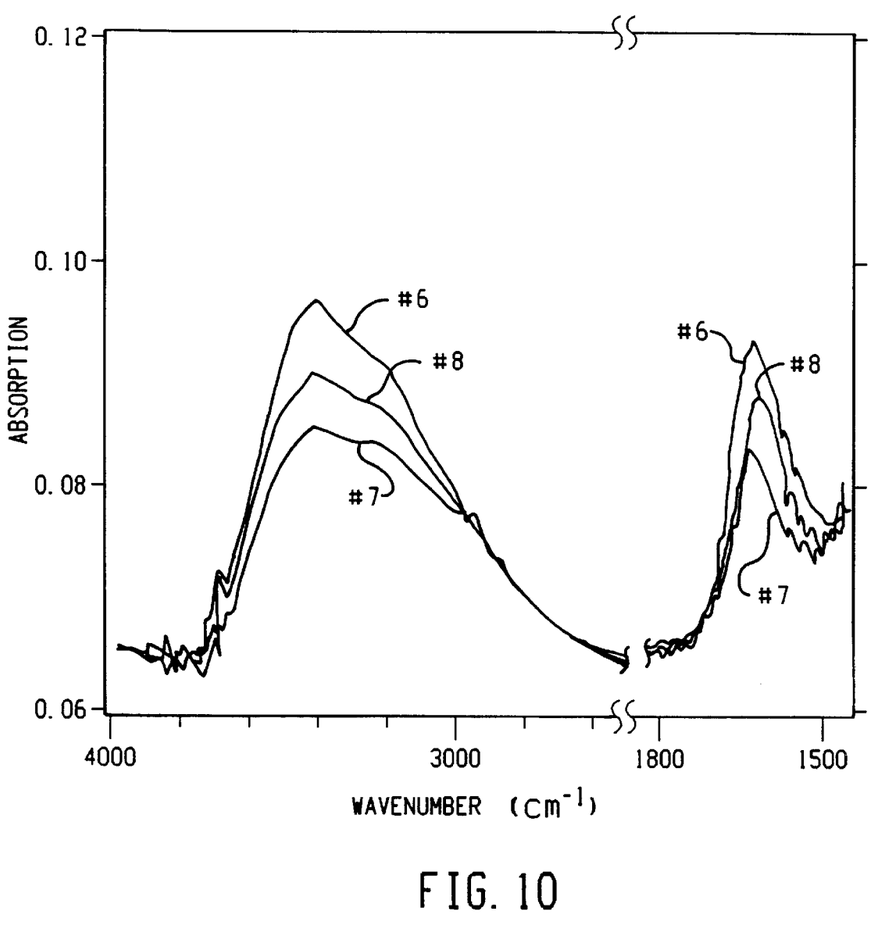
FIG. 10 is a graph showing the results of an infrared spectroscopic analysis, in Example B3, of a thin layer of anatase titanium oxide provided on a glass substrate with gold vapor-deposited thereon.

The results were as summarized in FIG. 10. As is apparent from FIG. 10, standing of the sample in the dark resulted in reduced stretching of OH of hydroxyl group, stretching of OH bond in physically adsorbed water, and bending of HOH bond in physically adsorbed water. Irradiation of the surface of the samples with ultraviolet light resulted in increased stretching of OH of hydroxyl group, stretching of OH bond in physically adsorbed water, and bending of HOH bond in physically adsorbed water. From the facts, it is considered that standing of the samples in the dark causes the hydroxyl group and the physically adsorbed water on the surface to be reduced leading to hydrophobification, while irradiation of the surface of the samples with ultraviolet light causes the hydroxyl group and the physically adsorbed water on the surface to be increased leading to hydrophilification.

When all the results of Examples B2 and B3 are taken into consideration, it is considered that the waterdrop-like protrusion portion in a mosaic form observed on the sample B4 is a hydrophilic section constituted by the hydroxyl group and the physically adsorbed water. It can be concluded that the waterdrop-like protrusion portion is a portion formed upon exposure of the surface of the sample B4 to ultraviolet light. Thus, the sample has such a surface that a hydrophilic section and a hydrophobic section of several tens of nm in size are dispersed in a mosaic form. It is believed that the mosaic structure creates a two-dimensional capillary phenomenon, leading to the development of amphiphilicity (both hydrophilicity and hydrophobicity).

Example C

A rutile titanium oxide single crystal was provided, and the contact angle of the (110) crystal face, the (100) crystal face, and the (001) crystal face with water was measured with a contact angle goniometer (CA-X150, manufactured by Kyowa Interface Science Co., Ltd.). The contact angle was measured 30 sec after dropping a water droplet through a microsyringe on the surface of the sample. As a result, the contact angle was 85° for the (110) crystal face, 30° for the (100) crystal face, and 84° for the (001) crystal face.

Each of the crystal faces was irradiated with ultraviolet light at 40 mW/cm$^2$ from a mercury lamp to investigate a change in contact angle of the crystal face with water as a function of the irradiation time.

Figure 11:
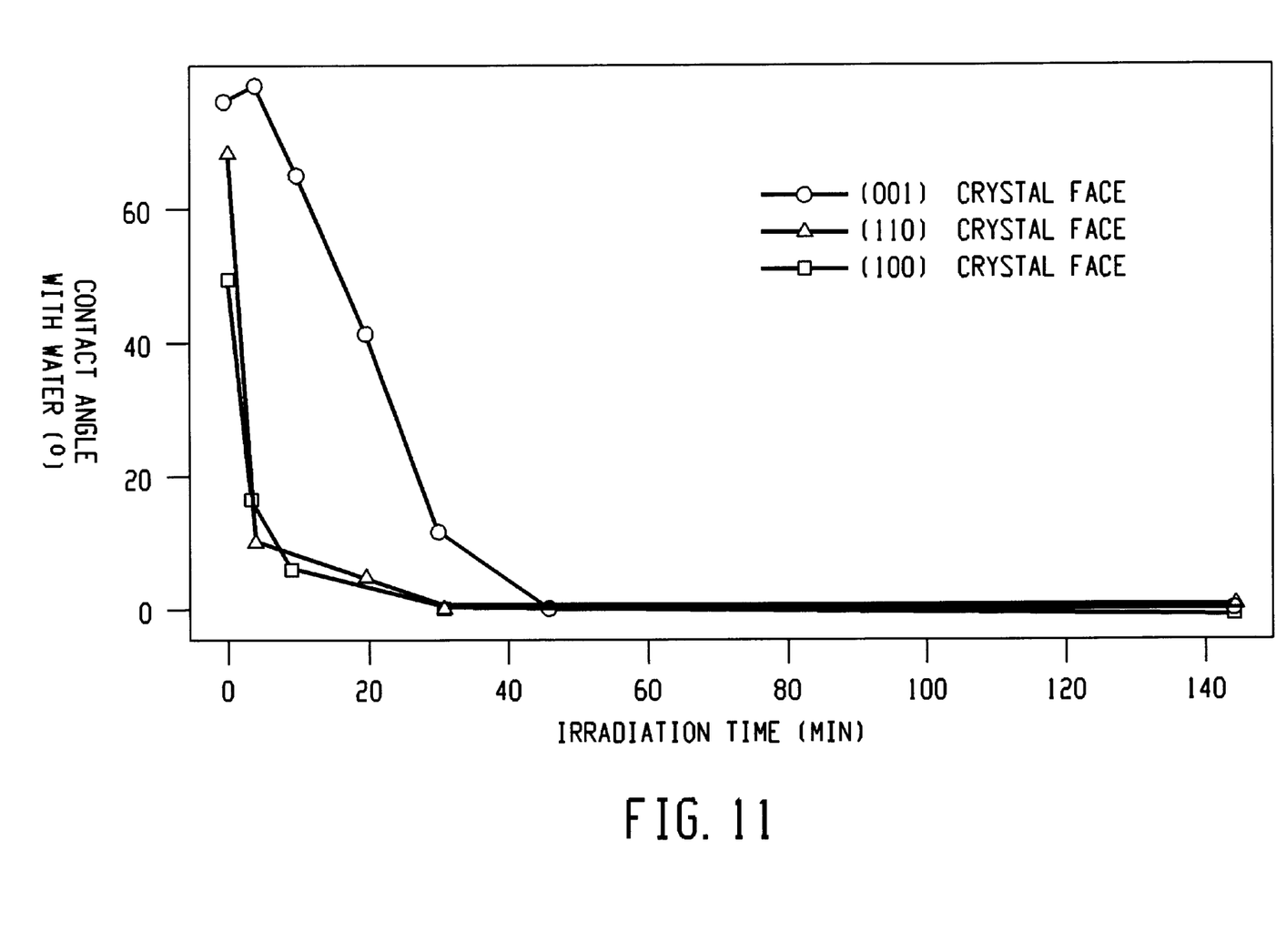
FIG. 11 is a graph showing the relationship between the contact angle of the (110) crystal face, the (100) crystal face, and the (001) crystal face of a rutile titanium oxide single crystal with water as a function of light irradiation time, the contact angle having been measured in Example C.

The results were as shown in FIG. 11. Specifically, as compared with the (001) crystal face, the (110) crystal face and the (100) crystal face were hydrophilified at a higher rate in response to the photoexcitation to a contact angle thereof with water of 0°.

What is claimed is:

1. A process for producing a member having an amphiphilic surface, comprising the steps of: providing a substrate; and forming a layer, containing a photocatalyst, on the substrate.

2. A method for amphiphilifying the surface of a member, comprising the steps of:

providing a substrate:

forming a layer, containing a photocatalyst, on the substrate; and photoexciting the photocatalyst to amphiphilify the surface of the layer.

3. A method of amphiphilifying the surface of a member as in claim 2, further comprising the step of discontinuing or substantially reducing the rate of photoexcitation before the entirety of said surface becomes hydrophilic.

4. An amphiphilic member comprising: a substrate; and a layer, containing a photocatalyst, provided on said substrate, wherein said photocatalyst comprises a metal oxide and oxygen atoms of said metal oxide are exposed on the surface of said layer, substantially all of said exposed oxygen atoms being oxygen atoms at bridging sites in the metal oxide.

5. The hydrophilic member according to claim 4, wherein the metal oxide is rutile titanium oxide with the (110) crystal face or (100) crystal face thereof being exposed on the surface of the layer containing a photocatalyst.

6. The hydrophilic member according to claim 4, wherein the metal oxide is anatase titanium oxide with the (001) crystal face thereof being exposed on the surface of the layer containing a photocatalyst.

7. A method for amphiphilifying the surface of a member, comprising the steps of: providing a substrate; and fixing a photocatalyst of a metal oxide onto the substrate so that only oxygen atoms at bridging sites in the metal oxide are substantially exposed on the surface of the layer containing a photocatalyst.

8. The method according to claim 7, wherein the metal oxide is rutile titanium oxide and the photocatalyst is fixed so that the (110) crystal face or (100) crystal face of the rutile titanium oxide is exposed on the surface of the layer containing a photocatalyst.

9. The method according to claim 7, wherein the metal oxide is anatase titanium oxide and the photocatalyst is fixed so that the (001) crystal face of the anatase titanium oxide is exposed on the surface of the layer containing a photocatalyst.

10. An amphiphilic member comprising: a substrate; and a layer, containing a photocatalyst, provided on the substrate, said layer having a surface, said surface having hydrophilic and hydrophobic regions, said hydrophilic regions having hydroxyl groups fixed thereto and water molecules physically adsorbed in the vicinity of said hydroxyl groups.

11. An amphiphilic member according to claim 10, wherein the total area of said surface covered by said hydrophilic regions is at least about 20% but less than 100%.

12. An amphiphilic member according to claim 10, wherein, on the surface of the layer containing a photocatalyst, said hydrophilic regions and said hydrophobic regions are present in a mosaic form.

13. An amphiphilic member according to claim 10, wherein the regions comprising the hydrophilic regions and the hydrophobic regions each have an area of about 100 to 10,000 nm$^2$.

14. An amphiphilic member according to claim 10, wherein said surface is amphiphilic such that oil deposited on said surface can be easily removed by rinsing the surface with water and water deposited on said surface can be easily removed by rinsing with oil.

15. An amphiphilic member according to any one of claims 10 and 13, wherein said surface has a contact angle with water of not more than 5° and a contact angle with glyceride trioleate of not more than 5°.

16. A member, selected from the group consisting of machine tools, bearings, and cutting disks, comprising: a substrate and a layer, said layer provided on said substrate, said layer containing a photocatalyst.

17. A member according to claim 16, wherein said layer has a surface and said surface may be photoexcited such that the surface has a contact angle with water of not more than about 5° and a contact angle with glyceride trioleate of not more than about 5°.

18. An amphiphilic member comprising:

a substrate; and a layer, containing a photocatalyst, provided on said substrate, said layer having a surface, and said surface having hydrophilic and hydrophobic regions, wherein said hydrophilic regions have a contact angle with water of about 37° or less.

* * * * *